United States Patent [19]

Yamada et al.

[11] Patent Number: 5,106,683
[45] Date of Patent: Apr. 21, 1992

[54] MAGNETIC RECORDING MEDIUM

[75] Inventors: Hiroyuki Yamada; Norifumi Kajimoto, both of Saku, Japan

[73] Assignee: TDK Corporation, Japan

[21] Appl. No.: 564,154

[22] Filed: Aug. 7, 1990

[30] Foreign Application Priority Data

Aug. 8, 1989 [JP] Japan .................. 1-203881

[51] Int. Cl.$^5$ ............................ G11B 23/00
[52] U.S. Cl. .................. 428/329; 428/694; 428/900
[58] Field of Search .......... 428/329, 403, 404, 402, 428/694, 900

[56] References Cited

U.S. PATENT DOCUMENTS

| | | | |
|---|---|---|---|
| 4,584,243 | 4/1986 | Kadokura et al. | 428/404 |
| 4,590,127 | 5/1986 | Hashimoto et al. | 428/404 |
| 4,740,423 | 4/1988 | Kadokura et al. | 428/403 |

Primary Examiner—Paul J. Thibodeau
Attorney, Agent, or Firm—Wood, Phillips, VanSanten, Hoffman & Ertel

[57] ABSTRACT

In a magnetic recording medium comprising a magnetic layer of a ferromagnetic powder dispersed in a resin binder and a nonmagnetic substrate for the layer, the magnetic layer contains zinc aluminate ($ZnAl_2O_4$) powder. The ferromagnetic powder is of chromium dioxide ($CrO_2$) and the $ZnAl_2O_4$ content in the magnetic layer is 0.01-1 wt % on the basis of the weight of the ferromagnetic powder.

1 Claim, 1 Drawing Sheet

MAGNETIC RECORDING MEDIUM

BACKGROUND OF THE INVENTION

This invention relates to a magnetic recording medium, and more specifically to a magnetic recording medium using a hard ferromagnetic powder, especially chromium dioxide ($CrO_2$), as a magnetic material.

Magnetic recording media for audio, video, or computer applications run, when recording or reproducing signals, in severe friction contact with magnetic heads. The magnetic recording medium whose magnetic layer uses a hard ferromagnetic powder, especially ferromagnetic $CrO_2$ powder, causes wear of the head rather faster than the media that rely upon ferromagnetic $\gamma$-$Fe_2O_3$ powder, with or without cobalt doping or coating on the surface. In view of this, when a hard ferromagnetic powder such as of $CrO_2$ is to be employed for the magnetic layer, means for reducing head wear and attaining good durability is required. To meet this end, it has been proposed to incorporate a nonmagnetic powder softer on Mohs scale than ferromagnetic $CrO_2$ powder as an additive into the magnetic layer. Patent Application Public Disclosure No. 7620/1985, for example, teaches allowing the magnetic layer to contain, besides ferromagnetic $CrO_2$ powder, additive powders of zinc oxide, $\alpha$-iron oxide, nonmagnetic chromium oxide, silica and the like in a combined amount constituting from 20 to 50% by volume of the total powder amount. The additive powders are meant for reduction of head wear. However, while the addition improves head wear, the considerable amount required can sometimes reduce electromagnetic transfer characteristics or accelerate fouling of the head. Where the ferromagnetic powder is $\gamma$-$Fe_2O_3$ or the like, alumina or other powder harder on Mohs scale than $CrO_2$ is often added. The use of such an additive powder in combination with $CrO_2$ is, of course, not advisable because it promotes head wear. U.S. Pat. No. 4,015,042 discloses a technique of adding an inorganic powder high on Mohs scale, e.g., alumina, besides a ferromagnetic $CrO_2$ powder or the like, to the magnetic layer, in an amount of about 2.5 to about 9% on the basis of the ferromagnetic powder amount. The technique is improper in that it increases head wear. As will be described in more detail later, the present inventors previously advocated in their copending Patent Application No. 73742/1989 the addition of 0.1 to 1.0% by weight of alumina, or far less than believed practical in the past. The concept helped alleviate the head wear and fouling (accumulation of wear products) problem to a considerable extent, but was still not a panacea for head wear.

BRIEF SUMMARY OF THE INVENTION

Therefore, the object of the present invention is to control head wear and improve head fouling, without sacrificing electromagnetic transfer characteristics, by providing a magnetic recording medium using a magnetic layer wherein a hard ferromagnetic powder such as $CrO_2$ powder is dispersed in a resin binder.

The present inventors have intensively studied ways of solving the problems of head wear, head fouling, and output drop by magnetic recording media using a ferromagnetic powder, for example $CrO_2$ powder. As a result, it has now been found that the addition of a very small amount of zinc aluminate ($ZnAl_2O_4$) permits control of head wear and reduces fouling of the head without affecting its electromagnetic transfer characteristics.

BRIEF DESCRIPTION OF THE DRAWING

The single FIGURE in the accompanying drawing is a graph showing the relationship between the amount of zinc aluminate ($ZnAl_2O_4$) added to a magnetic recording medium of the invention which uses chromium dioxide ($CrO_2$) and the amount of head wear.

DETAILED DESCRIPTION OF THE INVENTION $CrO_2$ powder is a ferromagnetic substance of acicular crystals about 0.3 to 0.6 $\mu$m long, with an $H_c$ of about 450 to about 9000 Oe and a residual flux density on the order of 1450 G, the Curie temperature being low at about 125° C. It is so hard, from 8 to 9 on Mohs scale, that the magnetic recording medium using it causes early head wear. Nevertheless, it has recently come into wider use as slave tapes for large-quantity copying by thermal transfer of records, which takes the advantage of the low Curie temperature of the powder. This invention provides a magnetic recording medium using such a hard magnetic powder characterized in that the powder is further mixed with a zinc aluminate ($ZnAl_2O_4$) powder.

Figure 1:
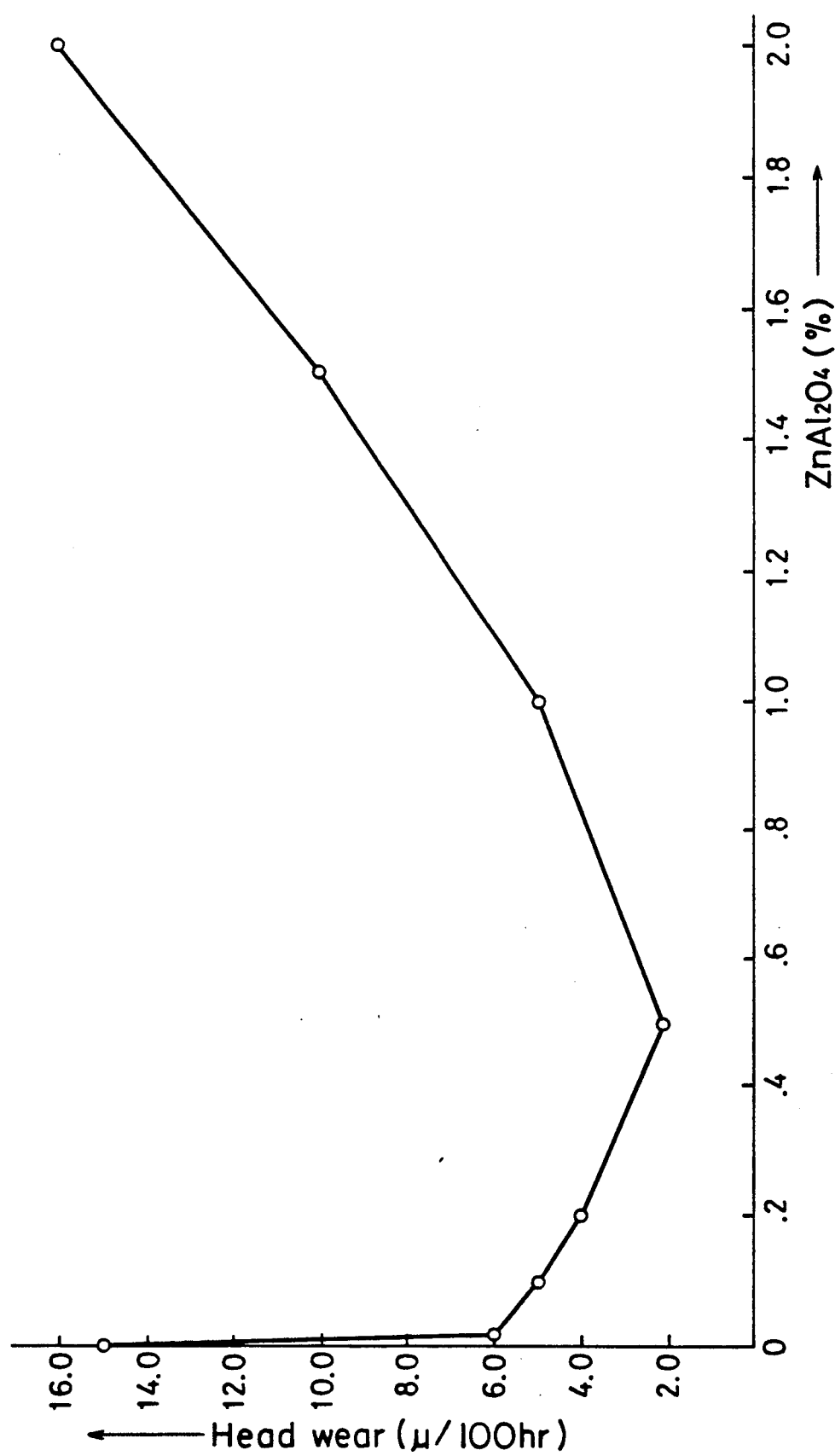

The nonmagnetic zinc aluminate ($ZnAl_2O_4$) powder to be used under the invention desirably has a particle diameter ranging from 0.3 to 0.4 $\mu$m. If the particle diameter exceeds 0.5 $\mu$m faster wear of magnetic heads will result. If the zinc aluminate ($ZnAl_2O_4$) powder is less than 0.01% by weight on the basis of the $CrO_2$ amount, head wear will not decrease, but a larger proportion than 1.5% by weight will no longer appreciably improve wear life. The addition of the aluminate powder in the range from 0.01 to 1.5% by weight, preferably from 0.1 to 1.0% by weight, will most effectively reduce the wear without choking the head.

Zinc aluminate ($ZnAl_2O_4$) powder can be prepared by wet mixing starting materials, $Al_2O_3$ powder and ZnO powder, firing the mixture at high temperature, and then finely grinding the fired product.

The $CrO_2$ powder and zinc aluminate ($ZnAl_2O_4$) powder in a predetermined ratio are dispersed in a resin binder, and the dispersion is applied fixedly to a nonmagnetic substrate of polyester or the like. The resin binder is a well-known one; any desired thermoplastic resin, thermosetting resin, electron-radiation-curing resin, or the like may be used. It may further be used with a known additive or additives.

Next, some embodiments of the invention will be described below.

The following compositions were prepared:

| Embodiments | in parts by weight |
| --- | --- |
| $CrO_2$ magnetic powder (mean particle dia. 0.3 $\mu$m, mean elong. 6.0/1) | 100 |
| $ZnAl_2O_4$ (mean particle dia. 0.35 $\mu$m) | 0–2.0 |
| Myristic acid | 0.5 |
| n-Butyl stearate | 0.75 |
| Vinyl chloride-vinyl acetate-vinyl alcohol copolymer | 11.11 |
| Polyurethane | 11.11 |
| MIBK | 100 |
| Cyclohexanone | 100 |
| THF | 100 |

COMPARATIVE EMBODIMENTS

In place of zinc aluminate ($ZnAl_2O_4$), 10% by weight each of $TiO_2$, $CaCO_3$, $ZnO$, or $\gamma$-$Fe_2O_3$ and 0.1, 0.5, or 1.0% by weight of $Al_2O_3$ were added to the above formulation.

The resulting compositions were dispersed and mixed to prepare magnetic coating materials. Each was applied to a 16 $\mu$m-thick polyester base film to form a coat with a dry thickness of 3 $\mu$m and dried. Thereafter the coated film was mirror finished by calendering rolls, slitted into magnetic tapes of a given width. Tapes thus formed were tested to determine their properties by the following methods.

METHODS OF EVALUATION AND CRITERIA

1. Y-S/N on self-recording-playback

50% luminance signals were recorded with a reference RF recording current. The S/N of the reproduced signals was determined by a noisemeter Model 925D manufactured by Shibasoku, or an equivalent. The S/N had to be at least 0.0 dB above that of a standard tape.

2. Y-S/N on thermomagnetic transfer

50% luminance signals were input to a master tape and then recorded by thermomagnetic transfer onto a $CrO_2$ tape. The S/N of the reproduced signals from the $CrO_2$ tape was determined by a noisemeter Model 925D manufactured by Shibasoku, or an equivalent. The S/N had to be at least 0.0, dB above that of a standard tape.

3. Head wear

After 100 hours of playback (a total of 50 runs of a test T-120 tape) at a temperature of 40$\pm$2° C. and 80$\pm$5% RH, the wear of video heads had to be no more than 6 $\mu$m.

4. Head fouling

After 100 hours of playback (a total of 50 runs of a test T-120 tape) at a temperature of 40$\pm$2° C. and 80$\pm$5% RH, the heads were wiped clean with polyester fiber reinforced unwoven tissue paper or the like. No residual foul or debris accumulated on the heads was acceptable.

The results are summarized in Table 1 and FIG. 1.

In the table "VTR Y-S/N" signifies the Y-S/N on self-recording-playback of each test tape and "TMD Y-S/N" the Y-S/N of a magnetic tape on thermomagnetic transfer from a test tape.

FUNCTIONAL EFFECTS

As will be clear from Table 1 and FIG. 1, the use of a very small amount (from 0.01 to 1.0%) of zinc aluminate ($ZnAl_2O_4$) powder reduces the wear of a magnetic head. A larger invention there occurs no such fouling or accumulation of wear products on heads as with conventional media containing nonmagnetic inorganic powders softer or lower on Mohs scale. Where the existing softer powders of lower Mohs hardness are to be added to the coating formulations, they must be used in relatively large amounts, say 10% by weight, since otherwise the decreased percentage of magnetic powder in the magnetic recording layer would result in reduced output. The amount of the powder used in accordance with the invention is too small to cause an output drop.

TABLE 1

| Additive | Comparative embodiments | | | | | | | | Embodiments | | | | | | |
|---|---|---|---|---|---|---|---|---|---|---|---|---|---|---|---|
|  | $TiO_2$ | $CaCO_3$ | $ZnO$ | $\gamma$-$Fe_2O_3$ | $Al_2O_3$ | | |  | $ZnAl_2O_4$ | | | | | | |
| Part by weigh(%) Electromagnetic transfer characteristic | 10 | 10 | 10 | 10 | 0.1 | 0.6 | 1.0 | 0 | 0.01 | 0.1 | 0.2 | 0.5 | 1.0 | 1.5 | 2.0 |
| VTRY-S/N | −2.0 | −2.0 | −2.0 | 0.0 | +0.0 | +0.0 | +0.0 | +0.0 | +0.0 | +0.0 | +0.0 | +0.0 | +0.0 | +0.0 | +0.0 |
| TMDY-S/N | −1.5 | −1.5 | −1.5 | −3.0 | +0.0 | +0.0 | +0.0 | +0.0 | +0.0 | +0.0 | +0.0 | +0.0 | +0.0 | +0.0 | +0.0 |
| Head wear $\mu$/100 hr | 8 | 6 | 5 | 6 | 3 | 6 | 10 | 15 | 6 | 5 | 4 | 2 | 5 | 10 | 16 |
| Head fouling | X | X | X | X | ◯ | ◯ | ◯ | X | ◯ | ◯ | ◯ | ◯ | ◯ | ◯ | ◯ |

What is claimed is:

1. A magnetic recording medium comprising a nonmagnetic substrate, and a magnetic layer on the substrate, the magnetic layer comprising chromium dioxide powder and zinc aluminate powder in the range of 0.01 to 1.0% by weight on the basis of the weight of the chromium dioxide dispersed in a resin binder.

* * * * *